United States Patent
Bhatti et al.

(10) Patent No.: US 7,665,511 B2
(45) Date of Patent: Feb. 23, 2010

(54) ORIENTATION INSENSITIVE THERMOSIPHON CAPABLE OF OPERATION IN UPSIDE DOWN POSITION

(75) Inventors: Mohinder Singh Bhatti, Amherst, NY (US); Ilya Reyzin, Williamsville, NY (US); Shrikant Mukund Joshi, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 654 days.

(21) Appl. No.: 11/441,604

(22) Filed: May 25, 2006

(65) Prior Publication Data

US 2007/0284093 A1   Dec. 13, 2007

(51) Int. Cl.
*F28D 15/00* (2006.01)
*H05K 7/20* (2006.01)
*H01L 23/34* (2006.01)

(52) U.S. Cl. .................. 165/104.33; 361/700; 257/715
(58) Field of Classification Search ............ 165/104.33; 361/700; 257/715
See application file for complete search history.

(56) References Cited

U.S. PATENT DOCUMENTS

| | | | |
|---|---|---|---|
| 5,587,880 A | 12/1996 | Phillips | 361/687 |
| 5,613,552 A * | 3/1997 | Osakabe et al. | 165/104.21 |
| 5,694,295 A * | 12/1997 | Mochizuki et al. | 361/699 |
| 5,803,161 A * | 9/1998 | Wahle et al. | 165/104.21 |
| 6,530,419 B1 * | 3/2003 | Suzuki | 165/80.3 |
| 6,840,311 B2 | 1/2005 | Ghosh | 165/104.33 |
| 6,918,431 B2 * | 7/2005 | Reyzin et al. | 165/104.21 |
| 7,168,480 B2 * | 1/2007 | Jankowski et al. | 165/104.26 |
| 7,198,096 B2 * | 4/2007 | Parish et al. | 165/104.33 |
| 7,520,317 B2 * | 4/2009 | Rusch et al. | 165/104.33 |
| 2004/0011511 A1 * | 1/2004 | Ghosh et al. | 165/104.21 |
| 2004/0099407 A1 * | 5/2004 | Parish et al. | 165/104.14 |
| 2005/0241807 A1 * | 11/2005 | Jankowski et al. | 165/104.26 |

* cited by examiner

*Primary Examiner*—Cheryl J Tyler
*Assistant Examiner*—Brandon M Rosati
(74) *Attorney, Agent, or Firm*—Patrick M. Griffin

(57) ABSTRACT

The invention provides a heat exchanger assembly having a housing which defines a boiling chamber extending along an axis between opposite ends. A plurality of first condensing tubes extend axially and downwardly in one direction at a first predetermined angle to and below the axis (A) from the housing and a plurality of second condensing tubes extend axially and upwardly in the opposite direction at the same predetermined angle to and above the axis (A) from the housing. The volume of refrigerant in the housing is greater than the volume of the second condensing tubes and the volume of the boiling chamber.

6 Claims, 2 Drawing Sheets

ORIENTATION INSENSITIVE THERMOSIPHON CAPABLE OF OPERATION IN UPSIDE DOWN POSITION

BACKGROUND OF THE INVENTION

1. Field of the Invention

The invention relates to a heat exchanger assembly for cooling an electronic device.

2. Description of the Prior Art

The operating speed of computers is constantly being improved to create faster computers. With this, comes an increase in heat generation and a need to effectively dissipate that heat.

Heat exchangers and heat sink assemblies have been used that apply natural or forced convection cooling methods to dissipate heat from electronic devices that are highly concentrated heat sources such as microprocessors and computer chips; however, air has a relatively low heat capacity. Thus, liquid-cooled units called LCUs employing a cold plate in conjunction with high heat capacity fluids have been used to remove heat from these types of heat sources. Although, LCUs are satisfactory for moderate heat flux, increasing computing speeds have required more effective heat sink assemblies.

Accordingly, thermosiphon cooling units (TCUs) have been used for cooling electronic devices having a high heat flux. A typical TCU absorbs heat generated by the electronic device by vaporizing a working fluid housed on the boiler plate of the unit. The boiling of the working fluid constitutes a phase change from liquid-to-vapor state and as such the working fluid of the TCU is considered to be a two-phase fluid. Vapor generated during boiling of the working fluid is then transferred to a condenser, where it is liquefied by the process of film condensation over the condensing surface of the TCU. The heat is rejected into ambient air flowing over the condenser and fins are commonly employed on the condenser to increase the heat transferred from the vapor. The condensed liquid is returned back to the boiler plate by gravity and thus the assembly is orientation sensitive.

Due to the universal use of portable or notebook computers which operate in a wide variety of orientations, orientation insensitivity is of growing importance. A few assemblies have been used that can operate in more than merely a horizontal or upright orientation.

Examples of thermosiphon assemblies include U.S. Pat. No. 5,587,880 to Phillips et al. and U.S. Pat. No. 6,840,311 to Ghosh et al.

The Phillips patent discloses an orientation insensitive thermosiphon including a boiling portion and a condensing portion connected by tubes, and a refrigerant which undergoes liquid-to-vapor-to-condensate transformation throughout the evaporator and condenser. The assembly also includes an electric heater which operates when the assembly is in an upside down position in order to create frothing of the condensate in the tubes directly below the condensing portion to bring the liquid refrigerant back up to the boiling portion without the use of gravity by way of bubbles.

The Ghosh patent teaches an orientation sensitive thermosiphon assembly comprising a housing defining a boiling chamber and having a first condensing tube extending in one direction from the boiling chamber and a second condensing tube extending in an opposite direction wherein both condensing tubes extend upwardly.

Although the prior art effectively dissipates heat from electronic devices, there is a continuing need for alternative designs for effectively dissipating heat from electronic devices. Specifically, there is a need for alternative designs for orientation insensitive thermosiphons that can operate in more orientation than conventional orientation insensitive thermosiphons, including an upside down position, without the use of electronic controls, pumps, or electric heaters.

SUMMARY OF THE INVENTION AND ADVANTAGES

The invention provides a heat exchanger assembly comprising a housing defining a boiling chamber extending along an axis between opposite ends for containing a refrigerant to undergo a liquid-to-vapor-to-condensate cycle. A plurality of first condensing tubes extend axially in one direction from the housing at a first predetermined angle from the axis and a plurality of second condensing tubes extend axially in an opposite direction from the housing at a second predetermined angle from the axis for condensing vapor boiled from the refrigerant. The first condensing tubes extend downwardly below the axis and the second condensing tubes extend upwardly above the axis.

The invention provides an alternative design for a compact heat exchanger for cooling an electronic device able to operate in a vertical position as well as at any angle of rotation through 360°, including in an upside down position. Furthermore, the assembly operates by gravity without the need for electronic controls, pumps or electric heaters.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
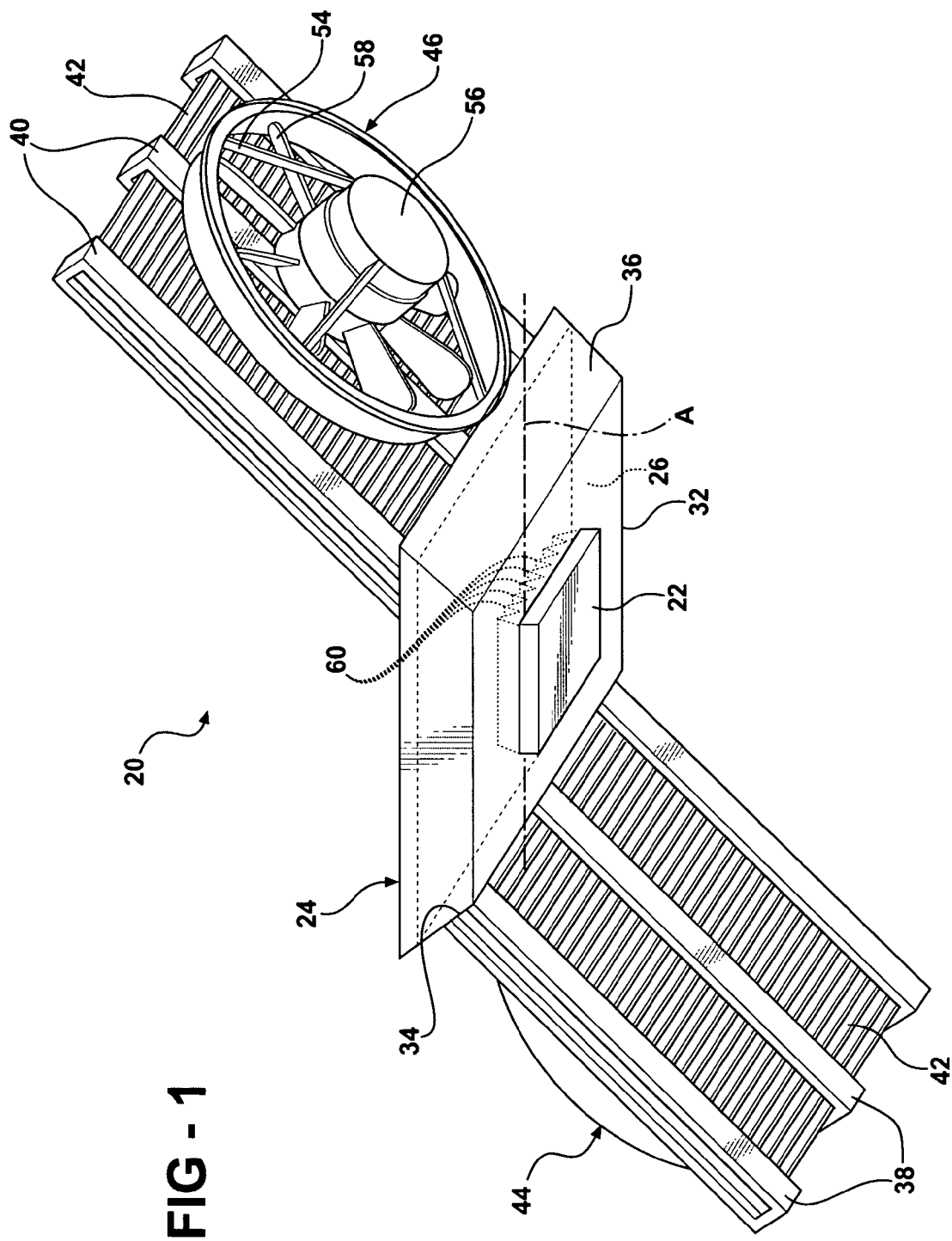
FIG. 1 is a perspective view of the preferred embodiment of the invention in an upright position.

Referring to the Figures, wherein like numerals indicate corresponding parts throughout the several views, a heat exchanger assembly 20 is generally shown for cooling an electronic device 22.

The assembly 20 includes a housing 24 generally indicated which defines a boiling chamber 26 extending along an axis A between opposite ends for containing a refrigerant 28 to undergo a liquid-to-vapor-to-condensate cycle. The housing 24 has a top wall 30 and a bottom wall 32 both extending axially and a first end wall 34 and a second end wall 36 both extending from the bottom wall 32 upwardly and outwardly to the top wall 30 forming opposite angled or oppositely flared end walls 34, 36.

A plurality of first condensing tubes 38 and a plurality of second condensing tubes 40 extend axially from the housing 24 for condensing vapor boiled from the refrigerant 28. The first condensing tubes 38 extend in one direction from the boiling chamber 26 at a first predetermined angle from the axis A perpendicularly from the first end wall 34. The second condensing tubes 40 extend in an opposite direction from the boiling chamber 26 at a second predetermined angle from the axis A and extend from the top wall 30 of the housing 24 adjacent to the second end wall 36. The condensing tubes 38, 40 have a rectangular cross-section, however, the condensing tubes 38, 40 may have cross-sections of other shapes including circular.

As shown in FIG. 1, a plurality of louvered air fins 42 extend between adjacent ones of the first condensing tubes 38 and between adjacent ones of the second condensing tubes 40 for dissipating heat therefrom. The louvered air fins 42 zigzag upwardly and outwardly between adjacent condensing tubes 38, 40 and extend along the length of the condensing tubes 38, 40.

A first fan assembly 44 generally indicated is supported adjacent to the first condensing tubes 38 and a second fan assembly 46 generally indicated is supported adjacent to the second condensing tubes 40. Both fan assemblies 44, 46 are single axial fans for moving air across the louvered fins 42.

The first fan assembly 44 includes a first shroud 48, a first motor 50 and a plurality of first fan blades 52 and the second fan assembly 46 includes a second shroud 54, a second motor 56 and a plurality of second fan blades 58.

A plurality of boiler heat transfer fins 60 are centrally disposed in the boiling portion of the housing 24 for transferring heat from the electronic device 22 to the refrigerant 28. The boiler fins 60 are positioned in the center of the housing 24 so that the refrigerant 28 covers the plurality of boiler fins 60 in an upright position, an upside down position and at all angles of tilt therebetween.

The assembly 20 is distinguished by the first condensing tubes 38 extending below the axis A and the second condensing tubes 40 extending above the axis A so that in an upright position the first condensing tubes 38 extend upwardly and the second condensing tubes 40 extend downwardly. As shown in the Figures, the first predetermined angled and the second predetermined angle are equal to one another whereby the first condensing tubes 38 are parallel to the second condensing tubes 40.

Figure 2:
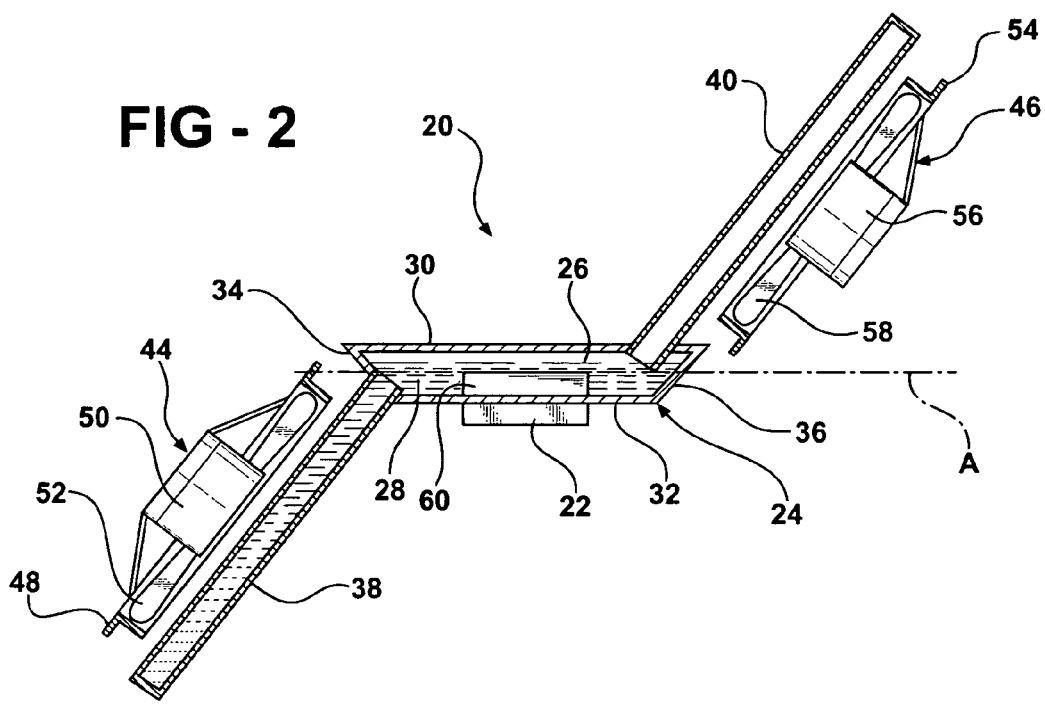
FIG. 2 is a cross-sectional view of the embodiment of FIG. 1 showing a liquid level filling a portion of the boiling chamber.
Figure 3:
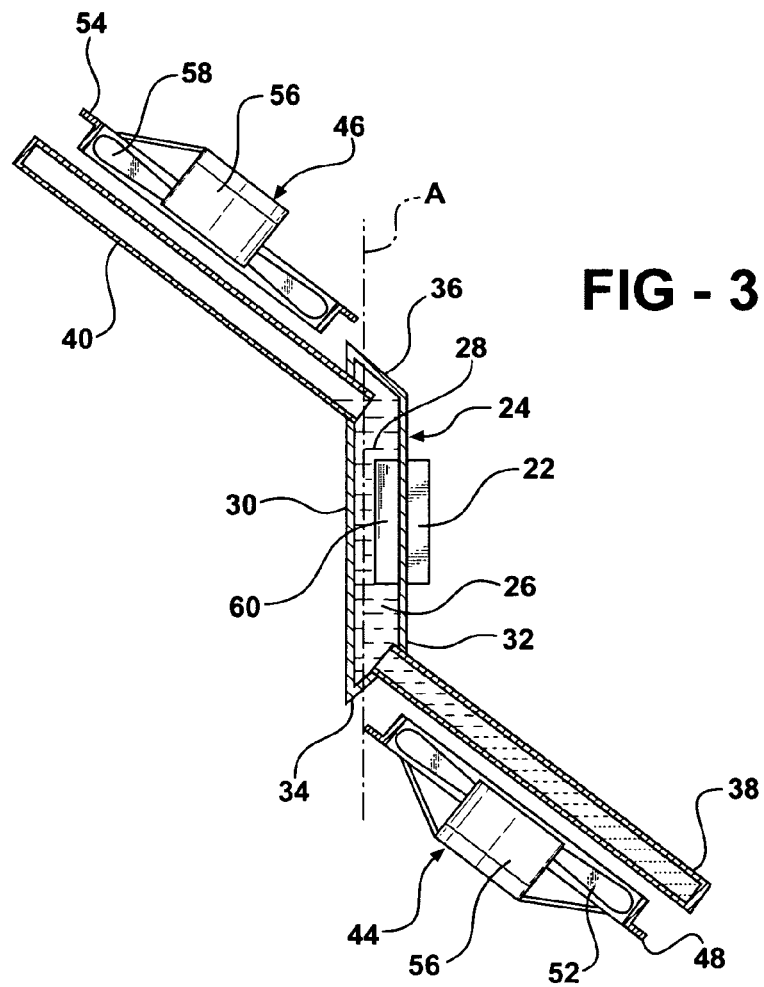
FIG. 3 is a cross-sectional view of the embodiment of FIGS. 1 and 2 rotated 90° and showing a liquid level filling the boiling chamber.

As shown in FIG. 2, a volume of the refrigerant 28 is greater than the volume of the first condensing tubes 38 and at least a portion of the volume of the boiling chamber 26 of the housing 24. Alternatively, the volume of the refrigerant 28 is greater than the volume of the second condensing tubes 40 and the volume of the boiling chamber 26 of the housing 24, as shown in FIG. 3. The position shown in FIG. 3 facilitates the liquid-to-vapor cycle within the housing 24 when the assembly 20 is in a vertical position by ensuring the refrigerant 28 is in contact with the boiler heat transfer fins 60 in all orientations.

In operation, the electronic device 22 generates heat which is transferred into the boiler heat transfer fins 60 and thereafter into the refrigerant 28 in the housing 24 causing the refrigerant 28 to boil. In an upright position, vapor boiled off of the refrigerant 28 rises into the second condensing tubes 40. In an upside down position, vapor rises into the first condensing tubes 38. Heat is then transferred from the condensing tubes 38, 40 into the louvered fins 42 and thereafter is dissipated into the air moving across the louvered fins 42.

Obviously, many modifications and variations of the present invention are possible in light of the above teachings. The invention may be practiced otherwise than as specifically described within the scope of the appended claims.

What is claimed is:

1. A heat exchanger assembly for cooling an electronic device comprising;
    a housing defining a boiling chamber extending along an axis between opposite ends for containing a refrigerant to undergo a liquid-to-vapor-to-condensate cycle,
    a plurality of first condensing tubes extending axially in one direction from said housing at a first predetermined angle from said axis and a plurality of second condensing tubes extending axially in an opposite direction from said housing at a second predetermined angle from said axis for condensing vapor boiled from the refrigerant, and
    said first condensing tubes extending below said axis and said second condensing tubes extending above said axis;
    wherein said housing has a top wall and a bottom wall both extending axially and a first end wall and a second end wall both extending from said bottom wall upwardly and outwardly to said top wall;
    wherein said first condensing tubes extend perpendicular from said first end wall; and
    wherein said second condensing tubes extend upwardly and outwardly from said top wall of said housing adjacent to said second end wall.

2. An assembly as set forth in claim 1 including a plurality of louvered air fins extending between adjacent ones of said first condensing tubes and extending between adjacent ones of said second condensing tubes for dissipating heat from said first condensing tubes and said second condensing tubes.

3. An assembly as set forth in claim 2 including a first fan assembly supported adjacent said first condensing tubes and a second fan assembly supported adjacent said second condensing tubes for moving air across said louvered fins.

4. An assembly as set forth in claim 3 wherein said first fan assembly includes a first shroud and a first motor and a plurality of first fan blades and said second fan assembly includes a second shroud and a second motor and a plurality of second fan blades.

5. An assembly as set forth in claim 1 including a plurality of boiler heat transfer fins centrally disposed in said boiling portion of said housing for transferring heat from the electronic device to the refrigerant.

6. A heat exchanger assembly for cooling an electronic device comprising;
    a housing defining a boiling chamber extending along an axis between opposite ends for containing a refrigerant to undergo a liquid-to-vapor-to-condensate cycle,
    said housing having a top wall and a bottom wall both extending axially and a first end wall and a second end wall both extending from said bottom wall outwardly to said top wall,
    a plurality of first condensing tubes extending axially in one direction perpendicularly from said first end wall and at a first predetermined angle from said axis and a plurality of second condensing tubes extending axially in an opposite direction from said left side wall of said housing at a second predetermined angle from said axis for condensing vapor boiled from the refrigerant,
    a plurality of louvered air fins extending between adjacent ones of said first condensing tubes and extending between adjacent ones of said second condensing tubes for dissipating heat from said first condensing tubes and said second condensing tubes,
    a first fan assembly supported adjacent said first condensing tubes for moving air over said louvered fins,
    said first fan assembly having a first shroud, a first motor, and a plurality of first fan blades,
    a second fan assembly supported adjacent said second condensing tubes for moving air over said louvered fins,
    said second fan assembly having a second shroud, a second motor, and a plurality of second fan blades,
    a plurality of boiler heat transfer fins centrally disposed in said boiling chamber of said housing for transferring heat from the electronic device to the refrigerant,
    said first condensing tubes extending below said axis and said second condensing tubes extending above said axis,
    wherein said first predetermined angle is equal to said second predetermined angle, and
    wherein a volume of the refrigerant is greater than the volume of said first condensing tubes and the volume of said boiling chamber of said housing.

* * * * *